United States Patent Office 2,988,851
Patented June 20, 1961

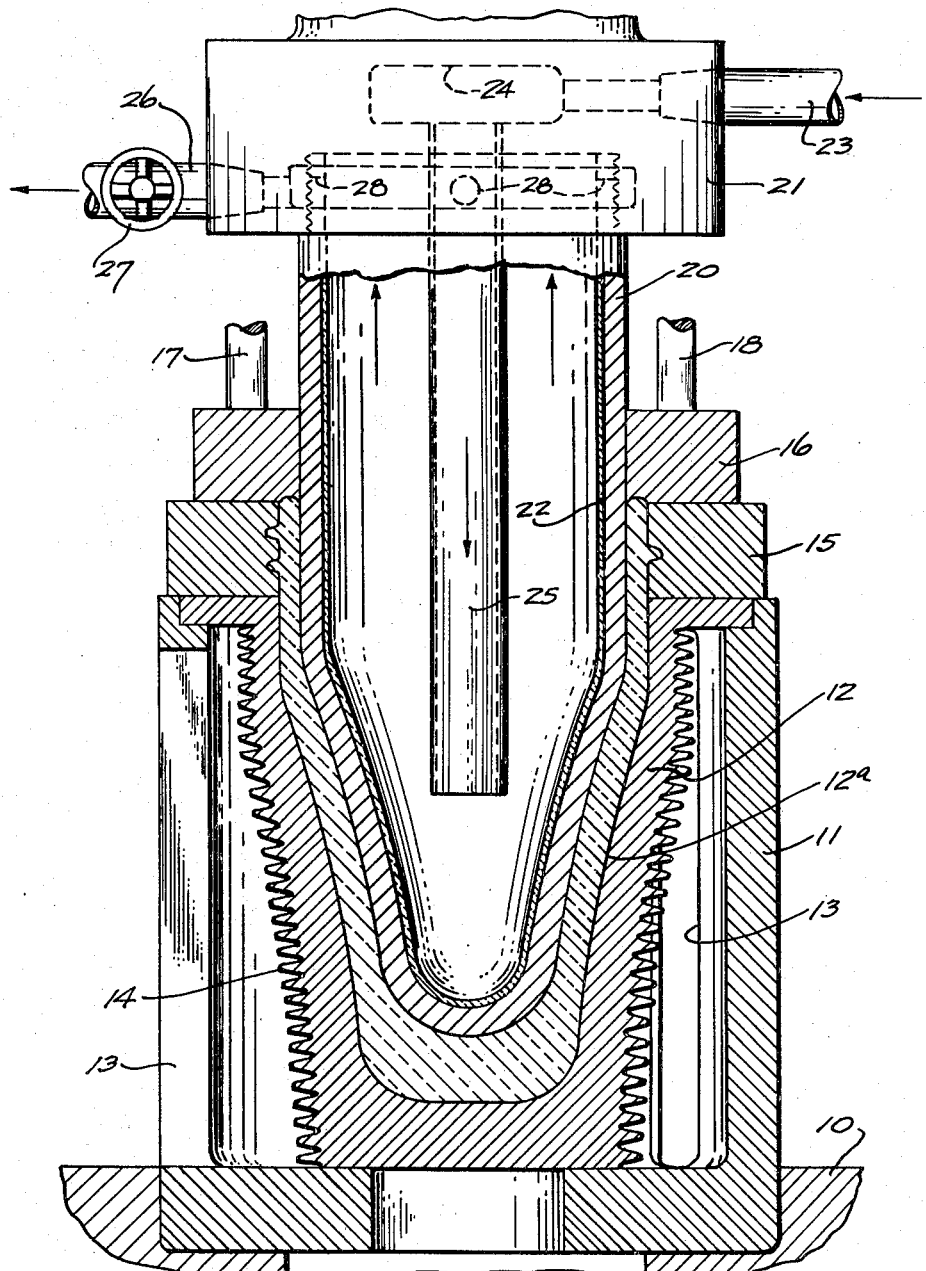

2,988,851
GLASS SHAPING TOOLS
Harry H. Holscher, Toledo, Ohio, assignor to Owens-Illinois Glass Company, a corporation of Ohio
Filed June 26, 1957, Ser. No. 668,256
2 Claims. (Cl. 49—40)

My invention relates to an apparatus for regulating and controlling the temperature of glass forming and shaping tools. In particular it relates to such tools as shaping plungers for pressing finally shaped articles and/or for forming blow openings in a parison of glass which is to be subsequently blown to final form.

In such forming or shaping operations, it is common practice to water cool such forming or shaping tools. There are many instances where water cooling cannot be used without flashing the water to steam, thus giving hardness deposits or giving a variable rate of cooling in any one cooling cycle. This variable rate results from first water cooling, followed by, second, steam flashing. Such a variable cooling cycle results in cyclical thermal shock upon the metal with consequent development of failure of the metal structure.

The proper design of water-cooled tools demands that the surface of the tool next to the glass operate at certain prescribed temperatures so as not to cause defects in the glass, while the surface of the tool being water cooled must remain at low enough temperature to avoid flashing of the coolant to steam or to other vapor. For example, in the case of a tool where the surface in contact with the glass is to operate at approximately 1000° F., if this tool were to be water-cooled on the side opposite to the side in glass contact, it would have to operate at low enough temperature to avoid flashing to steam. This temperature would perhaps be 200° F. This condition of prescribed limitations on the two surface temperatures means that the metal must have a thickness which will provide this thermal gradient and which depends upon the thermal conductivity of the metal. However, this is limited by the available thermal conductivity of metal, therefore the design must be by proper thickness of the metal and the choosing a metal having a desirable prescribed thermal conductivity. In many instances, however, the physical limitations of the forming equipment do not allow the use of metal which is thick enough to provide such a thermal gradient. In these instances, for example, in the shaping plunger, it is necessary to still provide the two surface temperatures above described. By the addition of a vitreous or other type coating of low thermal conductivity to the low temperature side of the metal, there is provided the proper thermal gradient so that the surface temperatures are unaltered and the coolant does not flash to vapor. Thus, we have a technique for providing a usable operating condition of inside and outside temperatures of a shaping plunger, for instance, without the development of coolant vapor, and within the prescribed metal wall thickness.

Consequently, some means other than the provision of certain types of metal, certain thicknesses thereof and full flow of cooling fluid is desirable. A primary object of this present invention is the provision of a nonconductive coating of a vitreous nature between the cooling fluid and the metal to thereby alter the temperature gradients and allow only a small temperature rise in the coolant while still maintaining a proper working temperature in the metal in physical contact with the molten glass.

A further object is to prevent and/or reduce the corrosion factor in such tools through prevention of direct water or coolant contact and thus extend the period of uninterrupted use.

Another object is the use of such coatings on any forming tools used in connection with the shaping and forming of molten material.

Other objects will be apparent from the following descriptive matter.

The drawing is a part sectional vertical elevation through a cooperating press plunger and shaping mold and illustrating in exaggerated form the coating on the inner wall of the plunger.

Referring to the drawings, there is shown a molding assembly which can well represent both the finished pressing of an article as well as the pressing of a parison for subsequent expansion into finished form.

Such a molding unit may be stationary at a single forming station or a series thereof may be mounted on a rotary table to be brought in sequence to a forming station. In any event, the table 10 will be supplied upon which will be mounted a mold support 11 having a forming mold 12 mounted therein.

The mold support 11 is provided with a series of openings 13 through which cooling air may be supplied to the outer surface area 14 of the mold 12. A fluid cooling system such as disclosed in the Weber Patent 2,688,823 may be utilized for this mold cooling.

A neck mold 15, adapted for cooperation with the forming mold 12 is provided at the top end of the mold and a stripper ring 16 mounted on guide pins 17 and 18, cooperates with the said neck mold 15.

The hollow pressing or forming plunger 20 is mounted in a head 21 and adapted for vertical reciprocation in and through the ring 16. This plunger 20 is provided on its inner surface with a coating 22 of a material of low thermal conductivity such as a vitreous enamel or other material of low heat conductive value.

Coolant in fluid form, is provided to the inside of the plunger 20 through pipe 23 to a chamber 24 in the head 21 and thence down into the inside plunger proper by pipe 25. The coolant passes continuously through the plunger 20 over and along the coating 22 through openings 28 and out the pipe 26, its rate of escape being regulated by a valve 27.

The general operation of this mechanism is as follows. A gob of molten glass is deposited in the cavity 12a of the mold 12. The head 21, plunger 20 and its cooperating ring 16 move down into the position shown in FIG. 1 displacing the glass into the form shown.

This displacement causes the outer shaping surface area of the plunger 20 to be completely encompassed by molten glass and in addition causes an immediate increase in the temperature of the metal in the body of the plunger. Normally there would be a relatively rapid rise in temperature in and through the walls of the plunger causing the coolant to rapidly heat and to flash to steam. However, with the provision of the coating 22 of material having low thermal conductivity and of a thickness ranging upwards from approximately a wave length to approximately 0.08 of an inch, the gradient in the metal plus the coating assembly does become greater thus allowing the use of the same type of cooling without flashing to steam. This is a result of the normal law of heat transmission where a surface coating of low thermal conductivity is placed upon a base having a higher thermal conductivity.

Under such circumstance, the body temperature of the plunger will increase but this may be offset or regulated by increasing or decreasing the volume or rate of the coolant through the plunger and over and along the coating. Thus, the plunger 20 may be retained at its optimum working temperature. With such a structure, relatively thin walled plungers may be utilized in the forming of glass articles.

From the preceding descriptive matter it should be quite apparent that this present invention has provided a method and structure for the control of the temperature of the walls of a forming tool for molten glass by and through the use of a composite or laminate wall structure capable of providing a thermal drop or temperature gradient in an unusually small space or wall thickness. In other words, a plunger having the disclosed structure may be utilized in the making of narrow neck pressed ware and the proper working temperature and thermal gradient in the plunger walls may be obtained and maintained even where the diametrical dimensional limitations are such that a working temperature gradient could not be obtained and maintained in the use of an ordinary plunger structure and especially under high speed production.

This present disclosure further teaches the theory wherein the wall of a shaping member is deliberately made to a cross sectional area thinner than that which is normally required for normal heat transfer in a normal operation. This deliberate thinning down of the cross section of the wall of course distorts the heat balance required in order to have a shaping member which will produce a succession of shaped articles in rapid succession. In other words, in the formation of glass articles it is necessary that the glass contacting walls obtained and maintained a compatible working temperature in order, (1) not to chill the glass excessively, and (2) not have the glass stick thereto.

In this present application there is also disclosed the theory of deliberately upsetting the heat balance in a shaping member by forming in it a wall that will not obtain and maintain the heat balance but will distort said heat balance during the working cycle and then compensate for this distortion by applying to a surface of said shaping member, a material of a low thermal conductivity and applying same on the wall opposite to that provided for shaping the molten glass. Thus with the combination of the thin base metal and the material of low thermal conductivity, a wall is thereby provided which will shape molten glass in rapid succession when a constant supply of coolant is applied over the coated surfaces and without proportioning the amount of cooling material applied thereto.

This present application is a continuation-in-part of my copending application Serial Number 473,668 filed Dec. 7, 1954 and now abandoned.

Modifications may be resorted to within the spirit and scope of the appended claims.

What I claim is:

1. In a structure for shaping molten glass, the combination of a hollow self-supporting metal shaping member having its outer surface portions formed as a glass contacting and shaping wall surface, a heat dissipating wall surface formed opposite to and integral with said glass contacting surface, the metal forming the walls of said member and between said surfaces being of thin cross sectional area and having a known thermal conductivity, a coating joined to said heat dissipating surface of said shaping member and supported by said shaping member, said coating having a thickness not greater than 0.08 inch and having a thermal conductivity lower than that of the said metal member thereby providing thermal compensation for the thin walls of said forming member, and cooling means arranged to cool said coating.

2. A structure of claim 1 wherein said coating comprises a vitreous material.

References Cited in the file of this patent

UNITED STATES PATENTS

| | | |
|---|---|---|
| 199,583 | Siemens | Jan. 22, 1878 |
| 780,863 | Coleman | Jan. 24, 1905 |
| 1,717,643 | Williams | June 18, 1929 |
| 1,798,136 | Barker | Mar. 31, 1931 |
| 1,857,540 | Hardenberg | May 19, 1932 |
| 1,965,242 | Kelly | July 3, 1934 |
| 1,994,649 | Hopkins | Mar. 19, 1935 |
| 2,264,102 | Tretter | Nov. 25, 1941 |
| 2,326,730 | Kelly et al. | Aug. 10, 1943 |
| 2,440,245 | Chevigny | Apr. 27, 1948 |
| 2,688,823 | Weber | Nov. 20, 1950 |